United States Patent [19]

Tyssen et al.

[11] Patent Number: 4,727,258
[45] Date of Patent: Feb. 23, 1988

[54] OPTOELECTRONIC SYSTEM FOR PASSIVE RANGE METERING

[75] Inventors: Egon Tyssen; Stefan Scholz, both of Alzenau, Fed. Rep. of Germany

[73] Assignee: Honeywell Regelsysteme GmbH, Offenbach, Fed. Rep. of Germany

[21] Appl. No.: 854,450

[22] Filed: Apr. 21, 1986

[30] Foreign Application Priority Data

May 9, 1985 [DE] Fed. Rep. of Germany ....... 3516664

[51] Int. Cl.⁴ .............................................. G01P 3/36
[52] U.S. Cl. ...................................... 250/561; 356/28
[58] Field of Search .................... 250/560, 561; 356/1, 356/4, 28; 180/167, 168, 169; 340/556, 555, 557

[56] References Cited

U.S. PATENT DOCUMENTS 3,804,518 4/1974 Meyr ..................................... 356/28
4,135,817 1/1979 Young et al. .......................... 356/28
4,167,330 9/1979 Haville .................................. 356/28

Primary Examiner—David C. Nelms
Assistant Examiner—S. Allen
Attorney, Agent, or Firm—Clyde C. Blinn

[57] ABSTRACT

For passive range metering of moving vehicles a receiver is used having two detectors spaced apart and directed to the path of the vehicle which moves with constant speed and the length of which is known. The receiver measures the pass-through time of the image of the vehicle through the first detector and furthermore measures the traveling time of the image of the vehicle from one detector to the other. The distance E can be calculated by equation $$E = \frac{f \cdot l \cdot Q_t \cos^2\phi}{d_{ik}},$$

wherein f is the focal distance of the receiver optics, $Q_t$ is the quotient of the measured time values, l is the length of the vehicle.

7 Claims, 2 Drawing Figures

OPTOELECTRONIC SYSTEM FOR PASSIVE RANGE METERING

Optical range meters normally use the triangulation method where the images taken from two spaced viewing means are aligned optically or electronically and whereat the distance is determined by using the distance between the two viewing means and by using the required optical or electrical offset of one of the images for bringing it into alignment with the other. This method is useful for resting or slowly moving targets.

It is the object of the invention to provide a passive, optoelectronic measuring system for the distance to a vehicle which moves almost rectangularly with respect to the line of sight of the system. The new measuring system works under the condition that the speed of the vehicle doesn't change during the measuring interval. For this purpose the invention provides an optoelectronic system comprising an optical receiver directed to the traveling path of the vehicle at an angle of 90°-$\phi$ and having two detectors spaced apart in its focal plane and further having lens means provided in front of said detectors. It further comprises time measuring means for measuring on the one hand the time which the image of the vehicle needs for traveling through one of the detectors and on the other hand for measuring the time which the image of a vertical edge of the vehicle needs for traveling from the first detector to the second detector. Finally, the system includes calculating means for generating an electrical signal corresponding to the quotient of said two time signals and further for generating a signal indicating the distance. Since the invention requires the length of the vehicle to be known, it is primarily useful for determining whether or not a known type of vehicle, in particular a military vehicle or tank, passes the system within a predetermined distance range. The optoelectronic system of the invention is of simple mechanical and optical construction, requires only one lens system and may be used in a vehicle classifying system for the purpose that only vehicles passing within a predetermined range are monitored. This is true for land vehicles and sea vehicles as well.

The invention will now be described with respect to a preferred embodiment with reference to the enclosed drawings in which.

Figure 1:
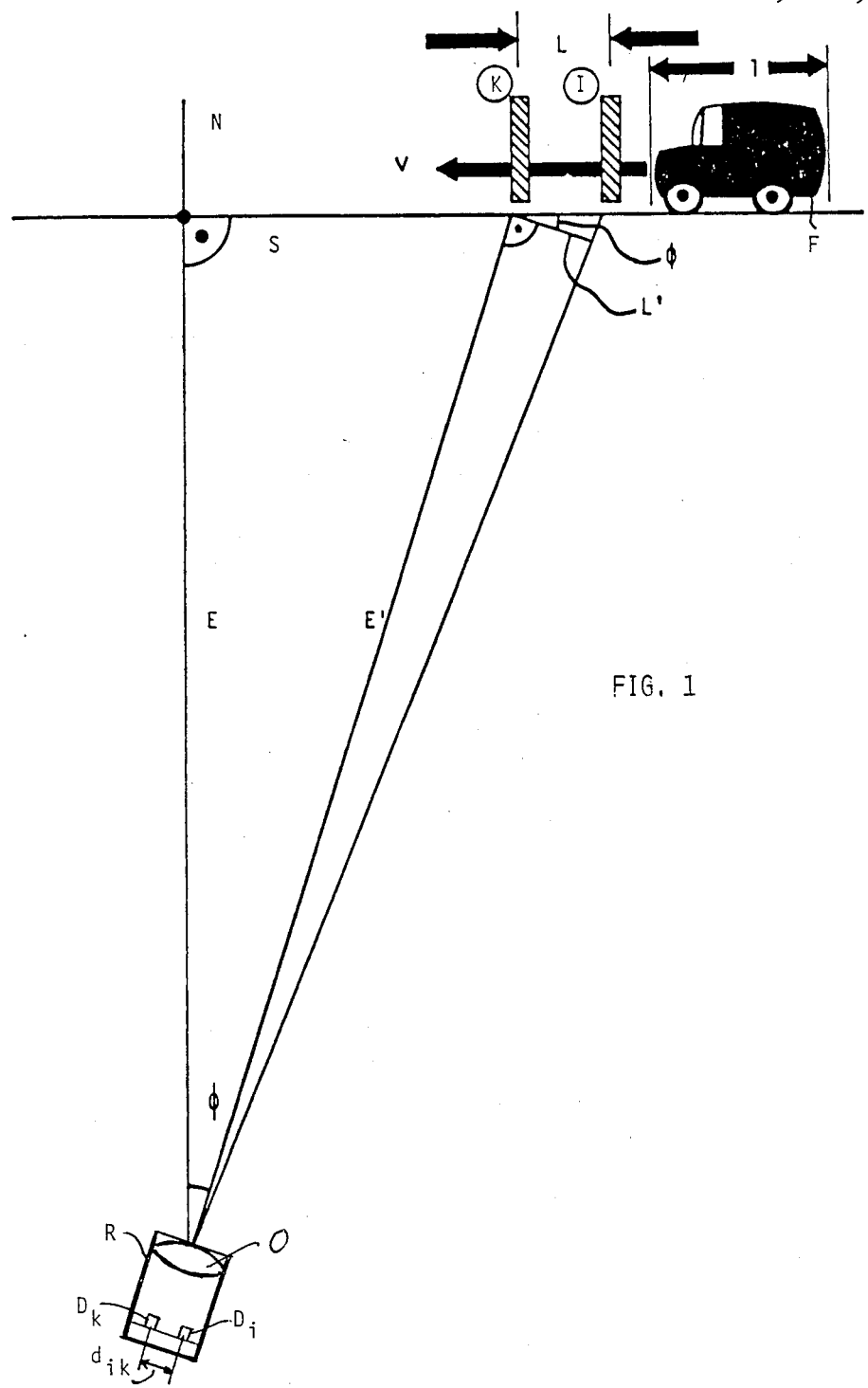
FIG. 1 shows the geometric relations of the measuring system.

As shown in FIG. 1 a vehicle F having a length $l$ moves with a speed v along a path S which is oriented perpendicularly with respect to the shortest distance E between the receiver R and the path S. The receiver includes at least two detectors $D_i$ and $D_k$ which are arranged with a lateral distance $d_{ik}$. A lens system 0 provided in front of the two detectors has a focal distance f. By means of this lens system 0 an image of the two detectors $D_i$ and $D_k$ is projected into the vertical plane of the path S and in this plane have a distance L. The vehicle having a length $l$ needs a time interval $t_i$ in order to pass through the area of detector $D_i$, which means that this period of time extends from the time when the forward edge of the vehicle enters into the area of detector $D_i$ until the rear end edge of the vehicle leaves the monitoring range of this detector. Furthermore, the vehicle F needs a time $t_{ik}$ for passing through the distance between the images I and K of the two detectors $D_i$ and $D_k$ which is the distance L and therewith is the distance $d_{ik}$ as projected onto path S. It is assumed that the velocity v of the vehicle F remains constant during the measuring process. The lead angle $\phi$ between line N on the one side which is perpendicular with respect to path S and line E' on the other side, which connects receiver R and the image K of the second detector $D_k$ as projected onto path S, depends on the focal length f of the lens system 0 and the distance $d_k$ between the two detectors. It is $$t_i = \frac{l}{v} \text{ and } t_{ik} = \frac{L}{v}$$

The quotient of these two times therewith is $$Q_t = \frac{t_{ik}}{t_i} = \frac{L}{l}$$

and therewith $$L = l \cdot Q_t \tag{I}$$

Therewith by this forming of a quotient the unknown but constant speed v is eliminated.

A trigonometric view on FIG. 1 shows that $$L' = L \cdot \cos \phi \text{ and } E = E' \cdot \cos \phi.$$

From the rule of optical imaging it follows $$L' = \frac{d_{ik}}{f} \cdot E'$$

and therewith $$L \cdot \cos \phi = \frac{d_{ik}}{f} \cdot \frac{E}{\cos \phi},$$

which means $$E = \frac{f \cdot L \cos^2 \phi}{d_{ik}} \tag{II}$$

By combining the results of equations (I) and (II) it follows that $$E = \frac{f \cdot l}{d_{ik}} \cdot \cos^2 \phi \cdot Q_t.$$

This means that distance E is proportional to the quotient $Q_t$, with other words $$E = \text{const} \cdot Q_t \tag{III}$$

Therewith it was shown that by measuring the above-mentioned two times $t_i$ and $t_{ik}$ a distance-dependent signal E can be generated.

Figure 2:
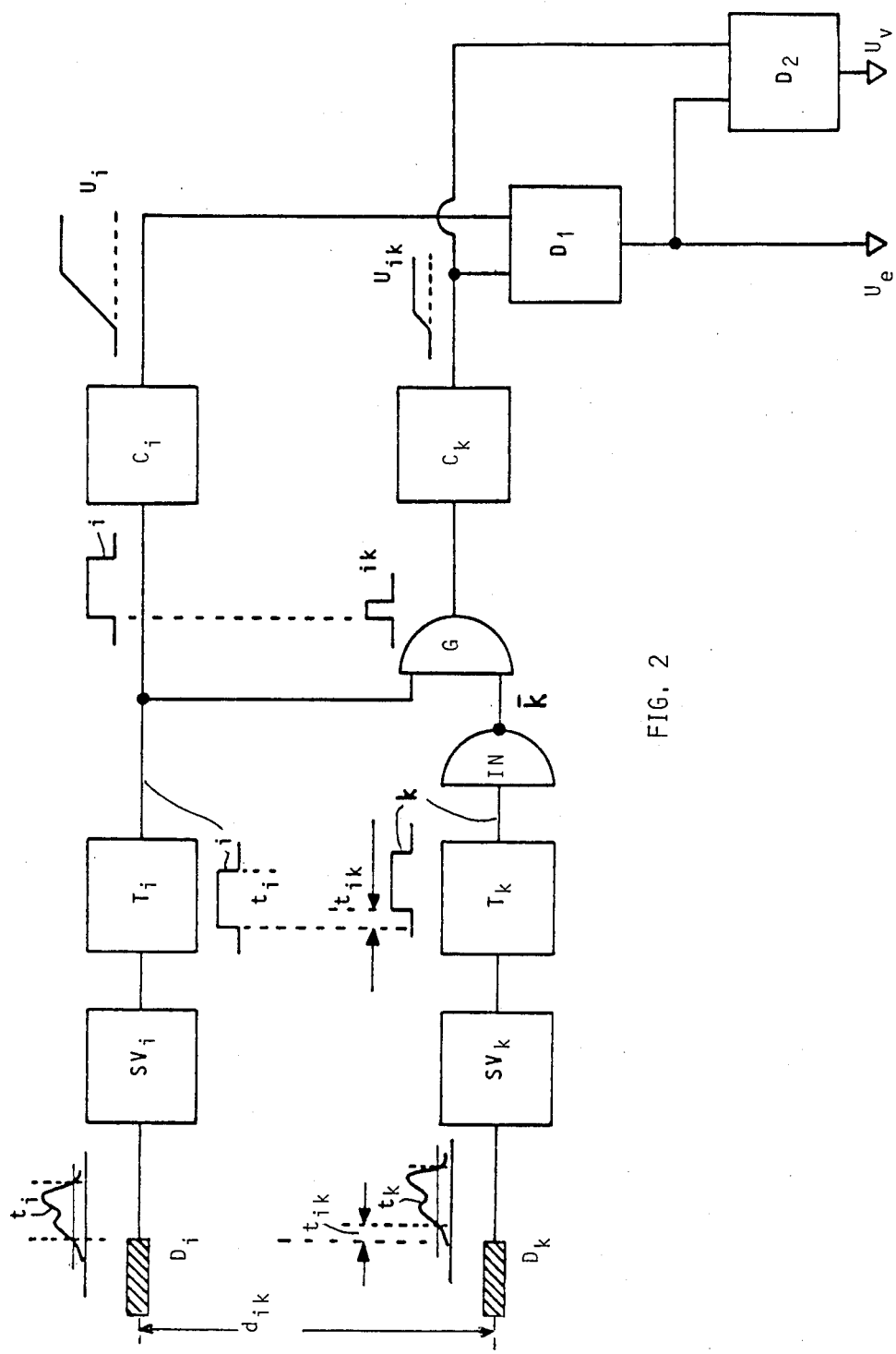
FIG. 2 shows a block diagram of the signal processing channels for the two detector output signals.

FIG. 2 shows one possibility of generating such a distance-dependent signal via two signal processing channels. As assumed the vehicle F moves with constant speed along path S and therewith enters projection I of the first detector $D_i$. Then the vehicle passes through the distance L between the two detector images I and K and then enters into image K of the second detector $D_k$. The two detectors $D_i$ and $D_k$ deliver output signals $t_i$ and $t_k$, respectively, as shown in FIG. 2 which are time delayed by a time interval $t_{ik}$, which as shown above corresponds to the quotient of the distance L and the speed v. These two detector output signals are amplified in amplifiers $SV_i$ and $SV_k$, respectively, and are fed to level trigger circuits $T_i$ and $T_k$, respectively, where square wave signals of identical amplitude are derived. At the outputs of the two trigger circuits $T_i$ and $T_k$ square wave signals i and k appear which are time delayed by the same time interval $t_{ik}$. Signal k is inverted by means of inverter IN and is fed to one input of AND-gate G. The other input of this gate G is connected to the output of trigger $T_i$ in the first signal processing channel. In this first channel a converter $C_i$ is connected to the output of trigger $T_i$ and derives from the square wave signal i a voltage $U_i$ which is proportional to the length of the square wave i. In gate G the output signal k of the second signal processing channel is subtracted from the output signal i of the first channel and a pulse ik is generated, whose length corresponds to the delay time $t_{ik}$. This pulse ik is fed to a second time/amplitude converter $C_k$, which derives from this pulse a voltage $U_{ik}$ which depends on the duration of pulse ik. Such time-to-amplitude converters as $C_i$ and $C_k$ are well-known in the art is linearized integrating circuits.

Now the quotient $Q_t$ has to be derived from the two signals $U_{ik}$ and $U_i$. For this purpose a division circuit $D_1$ is used delivering an output signal $U_e$ according to equation III as follows $$U_e = \frac{U_{ik}}{U_i} = k_1 \cdot e.$$

From this distance-dependent signal a speed dependent signal $U_v$ can be derived in accordance with equation $v = (L/t_{ik})$. For this purpose $U_e$ has to be divided by $U_{ik}$ which is proportional to the delay time $t_i$ and therewith to the length L of the vehicle. It follows $$U_v = \frac{U_e}{U_{ik}} = \frac{1}{U_i} = k_2 \cdot v.$$

In these equations $k_1$ and $k_2$ are system dependent constants.

In order to avoid interferences by daylight and shadow, the optical receiver preferably is an infrared receiver. The calculating circuit can be made as an analog circuit, preferably as an integrated circuit, or the calculation can be performed by a microprocessor. This processor then works along the calculating guidelines as described above with reference to FIG. 2. For increasing the accuracy more than two detectors or detector rows may be provided on the infrared sensitive surface of the optical receiver. By forming differences or quotients of the individual signal pairs, several distance values may be generated and be averaging or by statistical methods the distance value having the lowest error can be determined. With three instead of two detectors three independent measuring values can be derived and the same microprocessor will be able to evaluate and weigh these values. The distance metering system may be used for monitoring streets and ship passages if only vehicles moving along within a particular distance range are to be counted or recognized for other purposes. From the distance-dependent signal in connection with the speed-dependent signal a lead angle for a weapon firing on the vehicle can be derived.

We claim:

1. Optoelectronic system for passive metering of the distance of a vehicle moving approximately rectangular with respect to the line of sight of said system, comprising
   (a) an optical receiver directed to the traveling path of the vehicle at an angle of $90°\text{-}\phi$ and having two detectors spaced apart in its focal plane and further having lens means provided in front of said detectors;
   (b) time measuring means for measuring on the one hand the time ($t_i$) which the image of the vehicle needs for traveling through one of the detectors and on the other hand for measuring the time ($t_{ik}$) which the image of a vertical edge of the vehicle needs for traveling from the first detector to the second detector;
   (c) calculating means for generating an electrical signal ($Q_t$) corresponding to the quotient ($t_{ik}/t_i$) of said two time signals and further for generating a distance signal $$E = \frac{f \cdot l}{d_{ik}} \cdot \cos^2\phi \cdot Q_t$$

for the distance E between the optical receiver and a section point of the vehicle traveling path with a line extending perpendicular to said path and going through the receiver, wherein
   f is the focal distance of the lens means,
   l is the length of the vehicle,
   $d_{ik}$ is the distance between the two detectors,
   $\phi$ is the angle between a line E' extending from the receiver to the image of the second detector as projected by said lens means on said path and a line E from the receiver to said section point.

2. A system of claim 1, further including two signal processing channels wherein
   (a) each of the two signal processing channels are connected to the outputs of the two detectors and comprise a switching level circuit which derives from the detector output signal a square wave signal with predetermined amplitude and having a duration ($t_i$) corresponding to the time which the image of the vehicle needs for traveling through one of the detectors;
   (b) a gating circuit is provided in the second signal processing channel for generating a difference signal between the two square wave signals having a time delay with respect to each other and therewith generating a square wave signal of constant amplitude and with a duration ($t_{ik}$) corresponding to the time delay between said vertical vehicle edge passing through the two detectors;
   (c) a time/amplitude converter is provided in each of said signal processing channels;
   (d) the outputs of the two converters are connected to the inputs of a division circuit which at its output delivers the distance signal ($U_e$).

3. A system of claim 2, wherein the inputs of a second division circuit are connected to the output of the first division circuit and the output of the converter in the second signal processing channel, respectively, with said second division circuit delivering a signal ($U_v$) dependent on the speed of the vehicle.

4. A system of claim 1, wherein the calculating means is a microprocessor.

5. A system of claim 1, wherein the optical receiver includes two infrared detectors.

6. A system of claim 1, wherein the calculating means is a microprocessor.

7. A system of claim 2, wherein the optical receiver includes two infrared detectors.

* * * * *